(12) United States Patent
Burky et al.

(10) Patent No.: US 8,242,948 B1
(45) Date of Patent: Aug. 14, 2012

(54) HIGH FIDELITY SIMULATION OF SYNTHETIC APERTURE RADAR

(75) Inventors: John Burky, Uniontown, OH (US); Sharon Shahan, Massillon, OH (US)

(73) Assignee: Lockheed Martin Corporation, Orlando, FL (US)

(*) Notice: Subject to any disclaimer, the term of this patent is extended or adjusted under 35 U.S.C. 154(b) by 352 days.

(21) Appl. No.: 12/713,544

(22) Filed: Feb. 26, 2010

(51) Int. Cl.
*G01S 13/90* (2006.01)
*G09B 9/54* (2006.01)
*G01S 13/00* (2006.01)
*G09B 9/00* (2006.01)

(52) U.S. Cl. .......... 342/25 R; 342/52; 342/54; 342/175; 342/195; 434/1; 434/2; 356/3; 356/4.01; 356/4.02; 356/5.01

(58) Field of Classification Search ....... 342/25 R–25 F, 342/175, 195, 52–55, 165, 169–172, 176–183; 434/1–5; 356/3, 4.01, 4.02, 5.01
See application file for complete search history.

(56) References Cited

U.S. PATENT DOCUMENTS

| | | | | |
|---|---|---|---|---|
| 2,744,339 A | * | 5/1956 | Paine ............................... | 434/2 |
| 3,309,659 A | * | 3/1967 | Balding ........................ | 342/182 |
| 3,319,248 A | * | 5/1967 | Balding ........................ | 342/182 |
| 3,643,258 A | * | 2/1972 | Balding ........................ | 342/182 |
| 4,450,447 A | * | 5/1984 | Zebker et al. ................. | 342/171 |
| 5,192,208 A | * | 3/1993 | Ferguson et al. ................ | 434/2 |
| 5,353,030 A | * | 10/1994 | Koch et al. .................... | 342/169 |
| 5,680,138 A | * | 10/1997 | Pritt .............................. | 342/169 |
| 6,621,451 B1 | * | 9/2003 | Fisher et al. .................. | 342/176 |
| 7,095,420 B2 | | 8/2006 | Burky et al. | |

OTHER PUBLICATIONS

Balz, Timo et al., "High-Performance SAR Simulation on Retail Video Gaming Consoles for Education and Training Purposes," The International Archives of the Photogrammetry, Remote Sensing and Spatial Information Sciences, vol. XXXVII, Part B6a, 2008, pp. 213-220, Beijing, China.

Balz, Timo et al., "Improved Real-Time SAR Simulation in Urban Areas," IEEE International Conference on Geoscience and Remote Sensing Symposium, Jul. 31-Aug. 4, 2006, pp. 3631-3634.

Mallick, Satya Prakash, "Feature Based Image Mosaicing," http://www.cs.ucsd.edu/classes/fa02/cse252c/smallick.pdf, downloaded Oct. 2009.

Klinkenberg, Brian, Unit 39—The Tin Model, http://www.geog.ubc.ca/courses/klink/gis.notes/ncgia/u39.html, printed Oct. 22, 2009.

Soergel, U. et al., "Utilization of LIDAR DEM for SAR Image Analysis in Dense Urban Areas," downloaded Oct. 2009.

(Continued)

*Primary Examiner* — Bernarr Gregory

(74) *Attorney, Agent, or Firm* — Withrow & Terranova, PLLC

(57) ABSTRACT

Methods and systems for generating a raster file in a raster file format for use in a Digital Radar Landmass Simulator (DRLMS). A file in the raster file format defines synthetic aperture radar (SAR) scenery for use in generating a runtime database. The raster file contains a plurality of texture elements (texels) that define the SAR scenery. Each texel may have a material identifier, which identifies a material composition of a respective surface region of the SAR scenery; a surface height identifier, which identifies a surface height with respect to a bare earth elevation (BEE) value of the respective surface region; and a BEE identifier, which identifies a BEE of the respective surface region. A method for determining surface height identifiers based on digital surface model (DSM) elevation data is also provided.

21 Claims, 10 Drawing Sheets

OTHER PUBLICATIONS

No Author, Radar Basics—Synthetic Aperture Radar, http://www.radartutorial.eu/20.airborne/ab07.en.html, printed Sep. 24, 2009.

No Author, "Geodetic System," Wikipedia, http://en.wikipedia.org/wiki/Geodetic_system, printed Oct. 22, 2009.

No Author, "Triangulated Irregular Network," Wikipedia, http://en.wikipedia.org/w/index.php?title=Triangulated_irregular_network&printable=yes, printed Oct. 22, 2009.

No Author, "Answers to LIDAR Questions," http://www.csc.noaa.gov/beachmap/html/faqs.htmr#5.2, printed Oct. 22, 2009.

No Author, National Elevation Dataset, Fact Sheet 148-99 (Sep. 1999), http://egsc.usgs.gov/isb/pubs/factsheets/fs14899.html, printed Oct. 22, 2009.

No Author, National Elevation Dataset FAQ, http://ned.usgs.gov/NED/faq.asp, printed Oct. 22, 2009.

No Author, Triangulated Irregular Network, ET Spatial Techniques Web site, http://www.ian-ko.com/resources/triangulated_irregular_network.htm, printed Oct. 22, 2009.

* cited by examiner

HIGH FIDELITY SIMULATION OF SYNTHETIC APERTURE RADAR

FIELD OF THE INVENTION

The present invention relates to synthetic aperture radar (SAR) simulations, and in particular to a raster file format for use in a SAR simulation.

BACKGROUND OF THE INVENTION

Simulators are used extensively by the military to train fighter pilots. It is important that a simulator provide as realistic an experience as possible. A fighter jet simulator concurrently simulates many aspects of a flight, such as an out-the-window (OTW) simulation simulating what a pilot sees out the cockpit window while flying the fighter jet, and a radar simulation simulating what a pilot sees when looking at a radar display.

Some current generation fighter jets include a synthetic aperture radar (SAR) which provides a pilot with a high-resolution SAR map of potential targets on the ground. SAR is typically simulated using a Digital Radar Landmass Simulator (DRLMS). A SAR map includes terrain, lineal features such as roads and railroad tracks, and three-dimensional (3D) content of elevated features, including natural and cultural features such as buildings, vegetation canopy, and the like. 3D content in a SAR map is particularly important because of the importance of radar shadows for feature and object identification by a pilot or image analyst. Conventional mechanisms for injecting primary 3D content, such as buildings and trees, into a radar map include the generation of 3D polygonal models. Unfortunately, 3D polygonal development of high density urban areas is time intensive and costly. Moreover, because of the cost associated with manual 3D polygonal development, many of the ancillary features, such as cars, rocks, and bushes, are simulated using available ground imagery. While ground imagery may be acceptable for lower resolution radar simulations, in a high-fidelity SAR map simulation such ancillary features will appear flat, rendering the simulation unrealistic.

A DRLMS includes a database compiler, sometimes referred to as a formatter, which receives data defining attributes of the SAR scenery, and integrates and rasterizes the data to generate a proprietary runtime database of the SAR map. The data may be received from multiple files, each of which may be in a different format. For example, some of the data may be in a raster format, and other data may be in a vector format. Integrating such data and rasterizing vector-based data requires significant processing power and may take a substantial amount of time. Moreover, the use of different formats and different input sources makes it difficult to ensure quality control of the final runtime database. Finally, each DRLMS vendor uses a database compiler that requires data to be in a particular format, requiring different sets of data for the same SAR map simulation when using different DRLMSs. Accordingly, there is a need for a raster-based interchange file format (IFF) suitable for defining all aspects of SAR scenery that may be used by any DRLMS database compiler that is written to understand the IFF. There is also a need for a mechanism for defining 3D content in a SAR map without having to model each 3D feature using polygonal modeling techniques.

SUMMARY OF THE INVENTION

The present invention relates to a raster-based interchange file format (IFF) for use by a database compiler for generating a runtime database of a synthetic aperture radar (SAR) map for a SAR simulation. The IFF defines a plurality of channels, wherein each channel contains data identifying an attribute of a texture element (texel) of SAR scenery. Channel data is used by a database compiler to generate a runtime database of the SAR map which is depicted during a SAR simulation.

The IFF channels can include a material channel, an intensity channel, an orientation channel, a bare earth elevation (BEE) channel, and a surface height channel. The material channel includes a surface material identifier identifying a material composition, such as concrete or steel, of the respective texel. The intensity channel includes an intensity identifier identifying a grayscale intensity of the texel. The orientation channel includes an orientation identifier identifying an azimuth of a lineal feature represented by the texel. The orientation identifier may be used by a simulator to simulate a lineal feature having bidirectional radar reflectivity. The BEE channel includes a BEE identifier identifying a bare earth elevation of the texel with respect to a vertical datum reference point. The surface height channel includes a surface height identifier identifying a height of a surface region of an elevated feature, such as a natural or cultural feature like a building, a car, a tree, or a tower, with respect to a reference point. Based on the type of feature represented by any particular texel, one or more of the IFF channel identifiers for that texel may not have any corresponding data, which may be reflected by a null value. For example, the orientation identifier of a texel which represents a surface region of the imagery which is not a lineal feature may have a null value.

A database compiler inputs the channel data and generates a rasterized runtime database used to depict the SAR map during the SAR simulation. The rasterized runtime database is typically in a proprietary format unique to a particular Digital Radar Landmass Simulator (DRLMS) manufacturer. Because the IFF is raster-based, and the channel data is raster data, no polygon-to-raster conversion is required, and the database compiler can generate the rasterized runtime database using substantially less processing, and in substantially less time, than is required to generate a rasterized runtime database from vector data. Moreover, the use of raster data simplifies quality control by enabling the channel data to be examined by standard geographic information system (GIS) software packages.

In one embodiment, surface height identifiers identifying the height of elevated features are generated based on digital surface model elevation data, such as Light Detection and Ranging (LIDAR) data. The LIDAR data may be obtained for a desired ground area from any conventional LIDAR source. If the SAR simulation occurs in conjunction with an out-the-window (OTW) simulation, a horizontal registration process may be used to modify the LIDAR data to correlate the LIDAR data with the visual imagery used in the OTW simulation. A vertical datum registration process may then be used to modify the LIDAR data which is referenced to one vertical datum reference dataset, such as ellipsoid-referenced LIDAR data (e.g., WGS84 LIDAR data), to another vertical datum reference dataset, such as geoid-referenced LIDAR data. The geoid-referenced LIDAR data may be combined using blending and mosaicking techniques with other elevation data, such as National Elevation Dataset (NED) data and/or Digital Terrain Elevation Data (DTED), to derive SAR scenery of a desired area for the simulation. The geoid-referenced LIDAR data is then compared to a bare earth elevation source, such as the NED data, to derive the surface height channel data and the BEE channel data for each texel corresponding to a surface region of an elevated feature.

In one embodiment, the vertical datum registration process includes defining a plurality of control points, wherein each of the plurality of control points identifies a ground location on a geoid-referenced BEE dataset that corresponds to the ground. For each control point, a difference value is calculated by determining a difference between an elevation value of a LIDAR point corresponding to the ground location and an elevation value of a BEE point corresponding to the ground location. A triangulated irregular network is generated based on a plurality of difference values. The triangulated irregular network is then rasterized to form a rasterized elevation difference surface. For each LIDAR point, the elevation value is modified by the value of the rasterized elevation difference surface at that respective location, thus converting ellipsoid-referenced LIDAR point elevation values to geoid-referenced elevation values.

The surface height identifier of each texel may be determined by comparing each LIDAR point elevation value to the elevation value of the BEE point at the same location as the LIDAR point. If the difference is greater than a threshold value, such as one meter, for example, the surface height identifier for that texel equals the difference between the two elevation values. Otherwise, the surface height identifier for that texel is set equal to zero. If the difference is less than one meter, the BEE identifier for that pixel is set equal to the LIDAR point elevation value. Otherwise, the BEE identifier for that pixel is set equal to the minimum of the LIDAR point elevation value and the elevation value of the geoid-referenced BEE dataset at the same location.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a raster-based interchange file format (IFF) that defines synthetic aperture radar (SAR) scenery in a format that may be used by any database compiler, or formatter, to generate a runtime database of a SAR map for a simulator. The IFF may be implemented in a data structure in a memory, in a file, or in any other suitable electronic medium. The raster-based IFF reduces the processing time of the database compiler, and eases verification of data integrity. The present invention also uses available digital surface model elevation data, such as Light Detection and Ranging (LIDAR) data, to define three-dimensional (3D) feature content in the SAR scenery without the need to generate polygonal content, which substantially reduces development time and costs.

Figure 1:
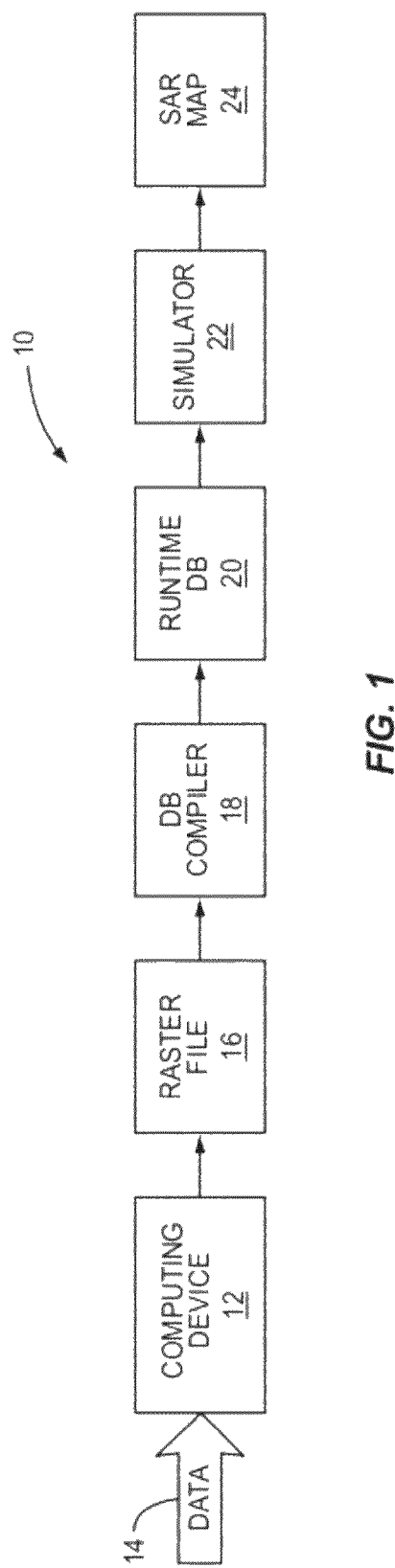
FIG. 1 is a block diagram illustrating an exemplary system in which the present invention may be practiced.

FIG. 1 is a block diagram illustrating an exemplary system 10 in which the present invention may be practiced. A computing device 12 receives one or more input data 14 which describe attributes of desired SAR scenery. The desired SAR scenery may relate to any desired ground area for which a simulation is desired. The input data 14, as described in greater detail herein, can include digital elevation model data, planimetric data, color visual imagery, digital surface model data, and other data, each of which describes particular attributes of the desired ground area. The computing device 12 uses the input data 14 to store data, as discussed herein, in a raster file 16 at a desired texture element (texel) resolution. The word "texel," as used herein, means any raster-based unit, such as a pixel, a voxel, a data post, and the like. For each texel, the raster file 16 has a plurality of channel data, each of which defines a particular attribute of the respective texel, such as bare earth elevation (BEE), surface height, grayscale intensity, and the like. A database compiler 18 reads the raster file 16 and generates a runtime database 20 in a desired raster-based format, which is typically a proprietary format unique to the vendor of the database compiler 18. A simulator 22 uses the runtime database 20 to generate and display a SAR map 24 to a participant participating in a SAR simulation.

Figure 2:
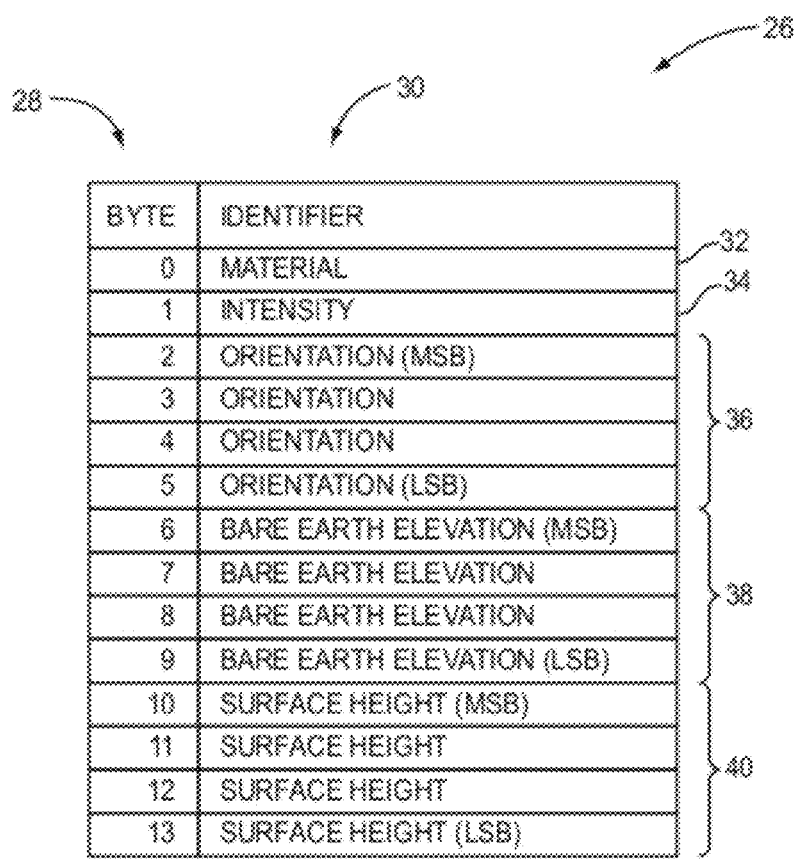
FIG. 2 illustrates an exemplary interchange file format (IFF) according to one embodiment of the present invention.

FIG. 2 illustrates an exemplary IFF 26 according to one embodiment of the present invention. The phrase "interchange" as used herein means the IFF 26 disclosed herein may be used by any desired database compiler 18 that is manufactured to interpret SAR scenery data encoded in the IFF 26. FIG. 2 includes a byte offset column 28 that illustrates exemplary byte offsets of the channel data defined by the IFF 26. However, it should be apparent that the number of bytes that may be allocated to any particular channel of the IFF 26 is design dependent. The notation "LSB" in FIG. 2 means least significant byte, and the notation "MSB" means most significant byte. For purposes of illustration, FIG. 2 also includes a channel data identifier column 30 containing labels for each channel of the IFF 26. While channels described herein are used to describe attributes of a texel, not all texels may have data in each channel. The IFF 26 includes a material channel 32 which contains a material identifier that identifies a particular material composition of the texel, such as concrete, grass, steel, and the like. The IFF 26 may also include an intensity channel 34 that contains an intensity identifier that identifies a grayscale intensity used to modulate the SAR map 24. The intensity identifier enables a more realistic simulation of a radar return of a surface by enabling a variation in the intensity of texels which make up the surface. In the absence of the intensity identifier, a simulated radar return off a surface at a given height and of a given material composition may appear overly uniform, and thus unrealistic.

The IFF 26 may also include an orientation channel 36 that contains an orientation identifier which identifies an azimuth of lineal features, such as roads and the like. The orientation identifier may be useful, for example, in simulations of lineal features that have bidirectional radar reflectivity. The IFF 26 includes a BEE channel 38 that contains a BEE identifier which identifies a bare earth elevation of the texel. The IFF 26 also includes a surface height channel 40 that contains a surface height of the texel with respect to the BEE identifier of the texel.

Figure 3:
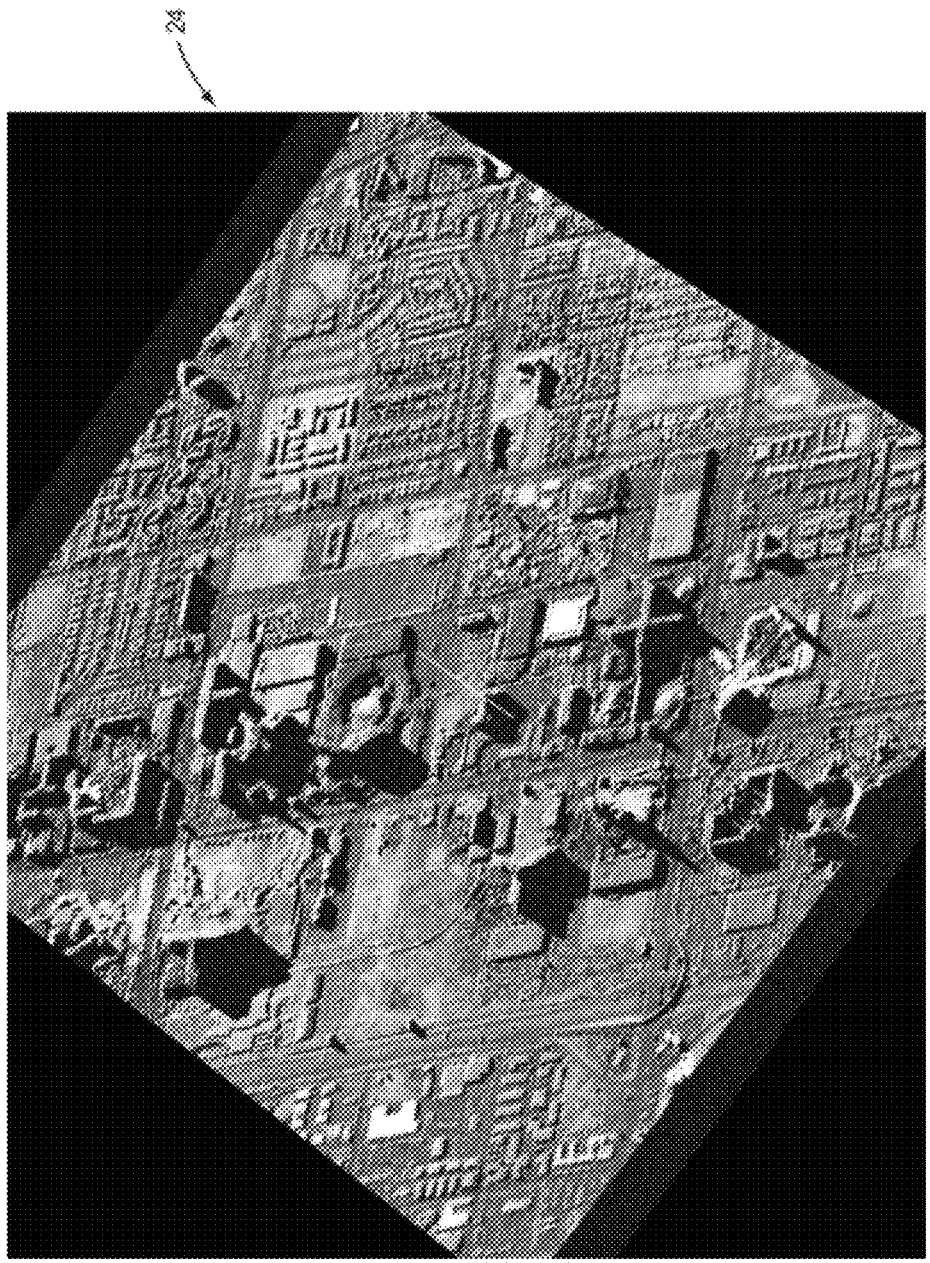
FIG. 3 illustrates an image of a synthetic aperture radar (SAR) map that was generated from a raster file according to one embodiment of the present invention.

FIG. 3 illustrates an image of the SAR map 24 generated from the raster file 16 formatted in the IFF 26. As illustrated, the SAR map 24 is a simulated high-fidelity image of a desired ground area, which in this particular example is the city of Las Vegas.

Figure 4:
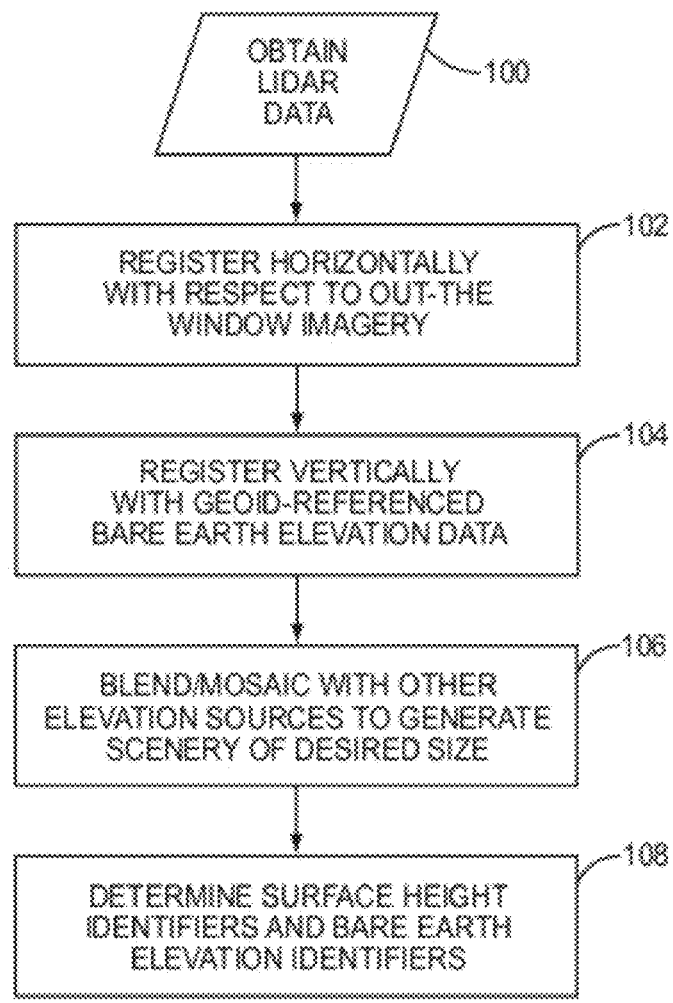
FIG. 4 is a flow chart illustrating an exemplary process for generating surface height identifiers and bare earth elevation (BEE) identifiers using Light Detection and Ranging (LIDAR) data according to one embodiment of the present invention.

Surface height identifiers of the present invention identify a surface height of a particular location identified by a respective texel with respect to a reference point. According to one embodiment of the invention, surface height identifiers identify a surface height with respect to a BEE value. Thus, according to this embodiment, the reference point of the surface height identifier is the BEE identifier. In such embodiment, for a texel which identifies a location on the ground that contains no feature, the surface height identifier has a value of zero. FIGS. 4-7 illustrate a process for determining surface height identifiers and BEE identifiers according to one such embodiment. FIG. 4 is a high-level flow chart illustrating an exemplary process for generating surface height identifiers and BEE identifiers using LIDAR data according to one embodiment of the present invention. While for purposes of illustration surface height identifier generation is discussed with the use of LIDAR data, other types of digital surface model (DSM) elevation data that identifies a height of elevated features, such as buildings, vegetation canopy, vehicles, and the like, may be used. For example, elevated surface height data may be obtained from stereo imagery data, or from Interferometric Synthetic Aperture Radar (IF-SAR) data, each of which may be suitable data for determining surface height identifiers in accordance with the present invention. The use of the DSM elevation data, in accordance with the present invention, may eliminate, or at a minimum greatly reduce, a need to individually model such elevated features using polygonal development tools.

According to one embodiment of the present invention, LIDAR data describing the desired ground area is obtained (step 100). LIDAR data is available from a number of LIDAR data vendors, such as Terrapoint USA Inc., The Woodlands, Tex., USA. The LIDAR data may then be sampled or interpolated using conventional techniques to generate LIDAR data at a desired texel resolution. LIDAR data at a desired texel resolution may sometimes be referred to herein as "gridded" LIDAR. If the SAR simulation will be conducted in conjunction with an out-the-window (OTW) simulation, the LIDAR data may be horizontally registered with respect to the OTW imagery which is used for the OTW simulation (step 102). Horizontally registering the LIDAR data with the OTW imagery synchronizes the view of the OTW display with the corresponding SAR map. The LIDAR data may be horizontally registered with the OTW imagery via conventional techniques, such as selecting a number of control point locations that identify the same ground location in both the OTW imagery and the LIDAR data, and performing a warp along the control points using a polynomial transformation.

The LIDAR data is then vertically registered with respect to a BEE data source, such as National Elevation Data (NED) (step 104). For example, the LIDAR data may be ellipsoid-referenced data, such as WGS84 data. The BEE data source may be geoid-referenced data, such as EGM96 data. The vertical registration step converts the LIDAR elevation values from ellipsoid-referenced elevation values to geoid-referenced elevation values. The LIDAR data may then be combined with other elevation sources, such as NED or Digital Terrain Elevation Data (DTED) for example, to generate scenery of a desired size (step 106). The LIDAR data and the other elevation sources may be combined via conventional techniques, including blending and mosaicking techniques. For each texel, the surface height identifier and the BEE identifier may then be determined (step 108).

Figure 5:
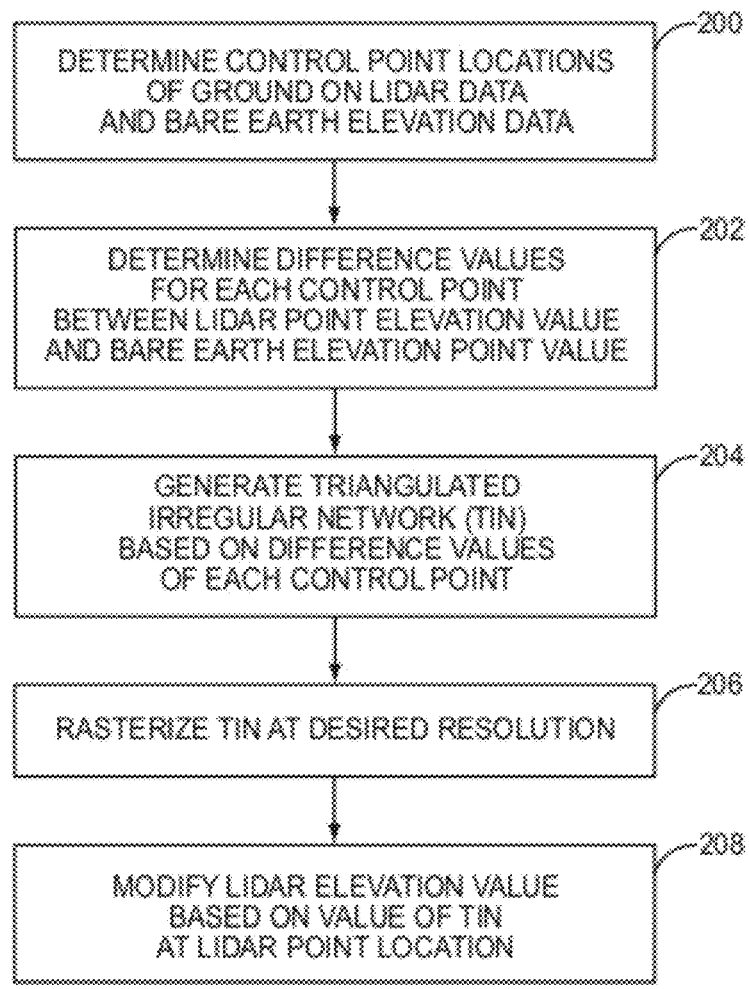
FIG. 5 is a flow chart illustrating the vertical registration step illustrated in FIG. 4 in greater detail.
Figure 6:
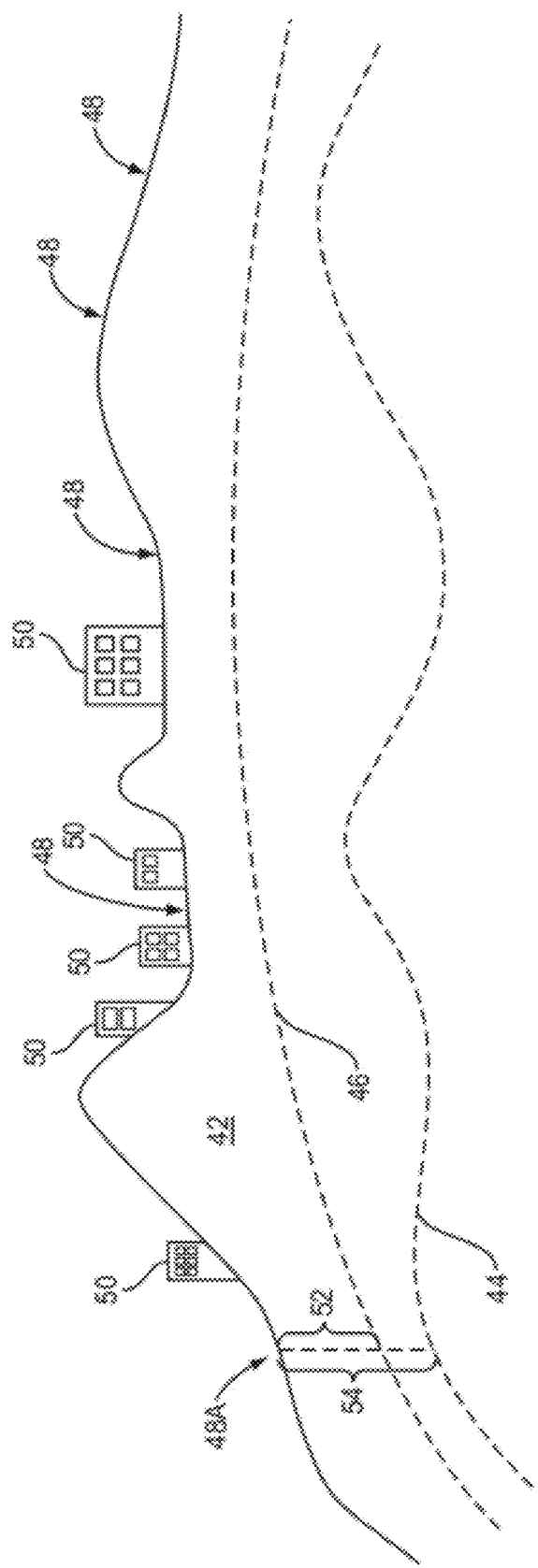
FIG. 6 is a diagram illustrating control point location selection according to one embodiment of the present invention.

FIG. 5 is a flow chart illustrating the vertical registration step 104 illustrated in FIG. 4 in greater detail. FIG. 6 is a diagram illustrating control point location selection and will be discussed in conjunction with FIG. 5. Referring first to FIG. 6, earth 42 has a geoid reference 44 and an ellipsoid reference 46. Initially, a number of control point locations 48 are identified wherein the BEE data (e.g., NED) and the LIDAR data are bare earth locations (FIG. 5, step 200). Note that each of the control point locations 48 is a location on the earth 42 wherein there is no elevated feature 50.

Because the LIDAR data is preferably generated at a desired texel resolution, the LIDAR data comprises a plurality of LIDAR points that correspond to the desired texel resolution. Each LIDAR point includes elevation data which identifies the elevation of the LIDAR point with respect to the ellipsoid reference 46. Each LIDAR point also includes location data, such as longitude and latitude data, identifying the location of the LIDAR point with respect to the surface of the earth 42. Similarly, the BEE data may also be sampled or interpolated at a desired texel resolution to generate BEE data at the same resolution as the LIDAR data. The BEE data similarly includes a plurality of BEE points, wherein each BEE point includes elevation data which identifies the elevation of the BEE point with respect to the geoid reference 44, and location data, such as longitude and latitude data, identifying the location of the BEE point with respect to the surface of the earth 42.

For each of the control point locations 48, the difference between the elevation value of the LIDAR point at the respective control point location 48 and the elevation value of the BEE point at the respective control point location 48 is determined (FIG. 5, step 202). For example, the difference between an elevation 52 (FIG. 6) of the LIDAR point corresponding to the control point location 48A and an elevation 54 of the BEE data point corresponding to the control point location 48A is determined. A triangulated irregular network (TIN) is then generated based on the difference values at each of the control point locations 48 (FIG. 5, step 204). The TIN is rasterized at the desired texel resolution of the LIDAR data and the BEE data to generate a rasterized elevation difference surface (FIG. 5, step 206). The elevation value of each LIDAR point is then modified based on the value of the rasterized elevation difference surface at the location which corresponds to the LIDAR point location (FIG. 5, step 208).

Figure 7:
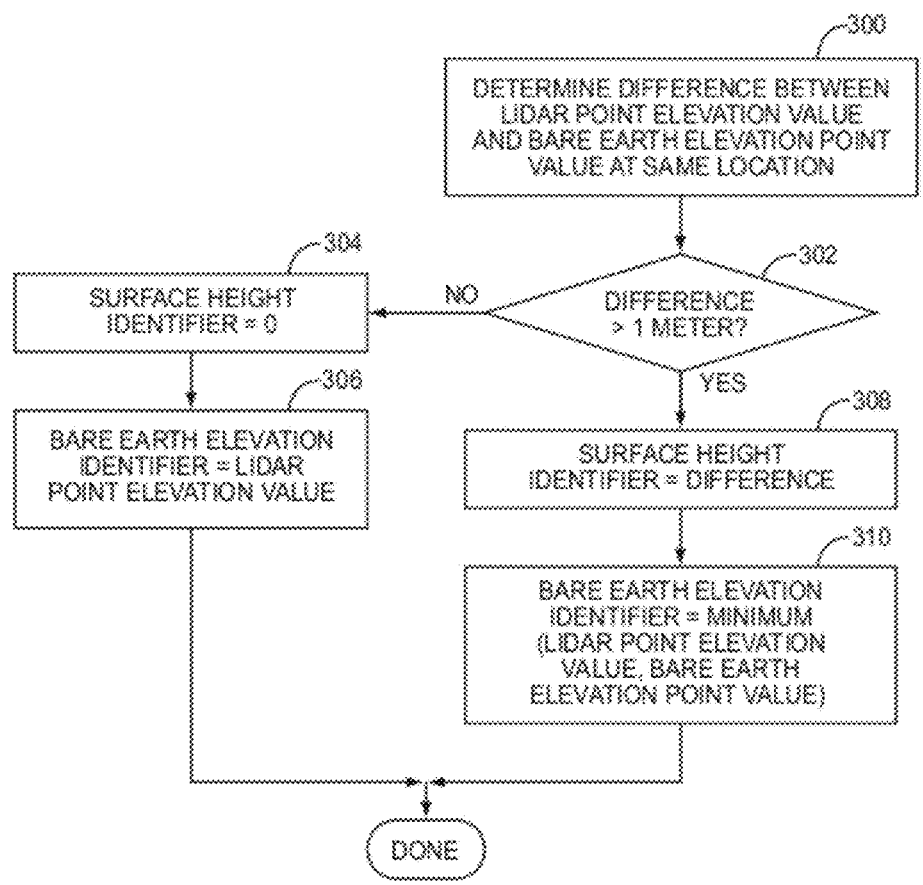
FIG. 7 is a flow chart illustrating the determination of surface height identifiers and BEE identifiers illustrated in FIG. 4 in greater detail.

FIG. 7 is a flow chart illustrating the determination of surface height identifiers and BEE identifiers illustrated in step 108 of FIG. 4 in greater detail. For each LIDAR point, a difference between the LIDAR elevation value of the LIDAR point and the elevation value of the BEE point at the same location is determined (step 300). If the difference is less than one meter (step 302), the surface height identifier is set equal to zero (step 304), and the BEE identifier is set equal to the LIDAR point elevation value (step 306). If at step 302 the difference is greater than or equal to one meter, then the surface height identifier is set equal to the difference (step 308), and the BEE identifier is set equal to the minimum of the LIDAR point elevation value and the BEE point value (step 310). This process is repeated for each LIDAR point.

According to another embodiment of the invention, surface height identifiers identify a height of a surface with respect to a vertical datum reference point, such as the ellipsoid-based vertical datum reference points or geoid-based vertical datum reference points. In this embodiment, a BEE identifier is not necessary because the surface height identifier includes the elevation of the bare earth above the referenced vertical datum reference point, as well as the elevation of any feature at that location. Where the location is bare earth that contains no feature, the surface height identifier contains a value equal to the bare earth elevation at that location. In this embodiment, the IFF of the present invention need not include separate BEE identifiers. Further, in this embodiment, the surface height identifiers may be determined based directly on the elevation values of the corresponding LIDAR points after the vertical registration process described with reference to FIGS. 4-6.

Figure 8:
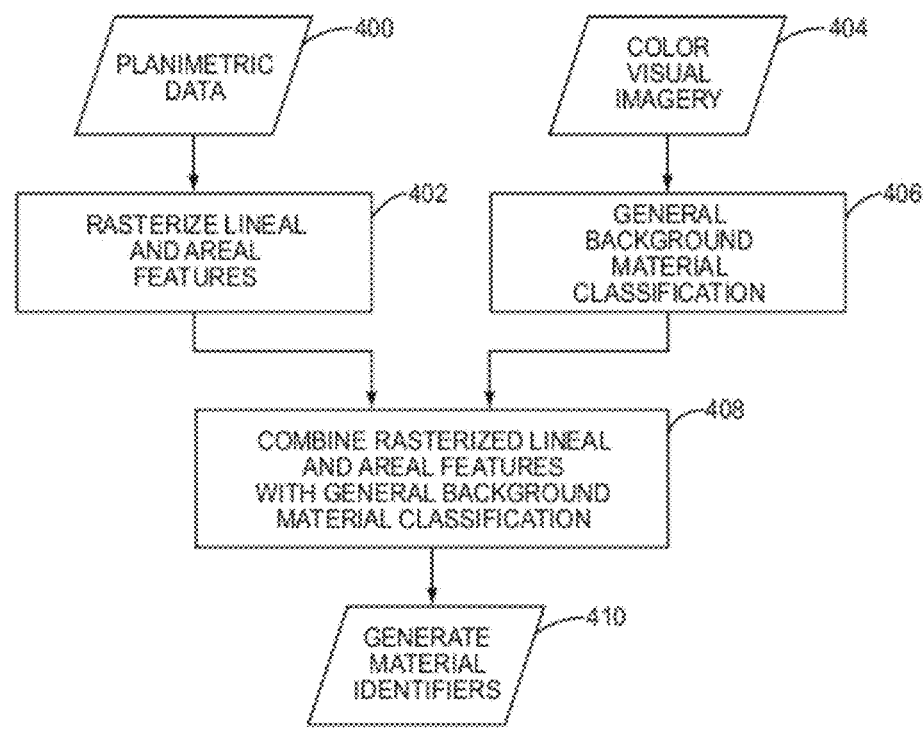
FIG. 8 is a flow chart illustrating an exemplary process for generating material identifiers according to one embodiment of the present invention.

FIG. 8 is a flow chart illustrating an exemplary process for generating material identifiers according to one embodiment of the present invention. Planimetric data identifying locations of roads, rivers, fences, and the like in the desired ground area is obtained (step 400). Planimetric data is commercially available from a number of sources, such as local or county governments. Planimetric data typically is provided in a vector format, with attributes describing the particular lineal features depicted by the data, such as the width and composition of the feature. The lineal and areal features of the planimetric data are rasterized to their respective widths at the desired texel resolution of the LIDAR and BEE data (step 402). Color visual imagery of the desired ground area is also obtained (step 404). The color visual imagery may be the same visual imagery used to create the OTW simulation. The color visual imagery is sampled or interpolated to generate color visual imagery at the desired texel resolution.

Background material classifications for the color imagery are generated (step 406). According to one embodiment of the present invention, background material classification may involve defining a 3D material classification cube having three axes, each axis having axis values ranging from 0 to 255. Volumes within the material classification cube are identified as corresponding to a particular material classification, such as concrete, asphalt, water, grass, dirt, steel, and the like, based on the color of the respective materials. The rasterized planimetric data and the color visual imagery are combined to form a combined raster (step 408). Each pixel of the combined raster has corresponding red-green-blue (RGB) values which define the color composition of the respective pixel. RGB values typically range from 0 to 255. The RGB value of each pixel is used to index into the material classification cube, and the material classification of the volume to which the RGB values index is assigned to the material identifier corresponding to that particular texel (step 410).

Figure 9:
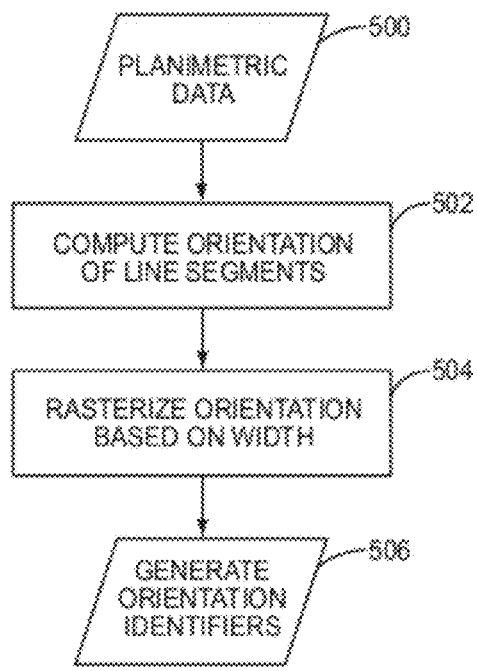
FIG. 9 is a flow chart illustrating an exemplary process for generating orientation identifiers according to one embodiment of the present invention.

FIG. 9 is a flow chart illustrating an exemplary process for generating orientation identifiers according to one embodiment of the present invention. Planimetric data of the desired ground area is obtained (step 500), as discussed previously with respect to FIG. 8. For each line segment corresponding to a planimetric feature, an orientation value in the range of 0-180 is determined (step 502). According to one embodiment, certain orientation values may be in the following form: 0 is equal to north-to-south; 45 is equal to northeast-to-southwest; 90 is equal to east-to-west; and 135 is equal to southeast-to-northwest. The lineal features are then rasterized to the determined orientation at the appropriate width of the respective lineal feature to generate an orientation raster (step 504). The orientation identifier of each texel which corresponds to a lineal feature in the orientation raster is then set equal to the orientation value of the corresponding pixel in the raster (step 506).

Figure 10:
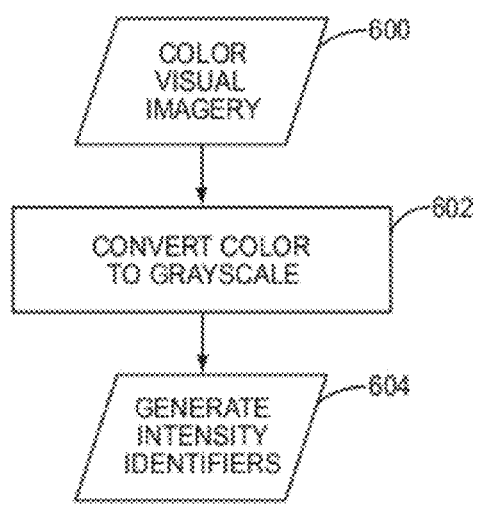
FIG. 10 is a flow chart illustrating an exemplary process for generating intensity identifiers according to one embodiment of the present invention.

FIG. 10 is a flow chart illustrating an exemplary process for generating intensity identifiers according to one embodiment of the present invention. Color visual imagery of the desired ground area is obtained (step 600). If the color visual imagery is not at the desired texel resolution, the color visual imagery may be sampled or interpolated to generate the color visual imagery at the desired texel resolution. The color is converted to grayscale using conventional techniques (step 602). For each texel, the intensity identifier is set equal to the grayscale value of the corresponding pixel (step 604). The use of an intensity identifier generated from color visual imagery provides the SAR map an aesthetically realistic appearance.

The invention has been described herein with reference to storing the various identifiers, such as the BEE identifier, the material identifier, the intensity identifier, the surface height identifier, and the orientation identifier, in the raster file 16. However, in an alternate embodiment, such identifiers could be communicated substantially in real-time to other destinations, such as the database compiler 18, without an intermediate storage in the raster file 16. In yet another embodiment, the computing device 12 could stream, or otherwise communicate the identifiers to a remote storage device destination for storage in a remote raster file 16 for subsequent use by the database compiler 18.

Figure 11:
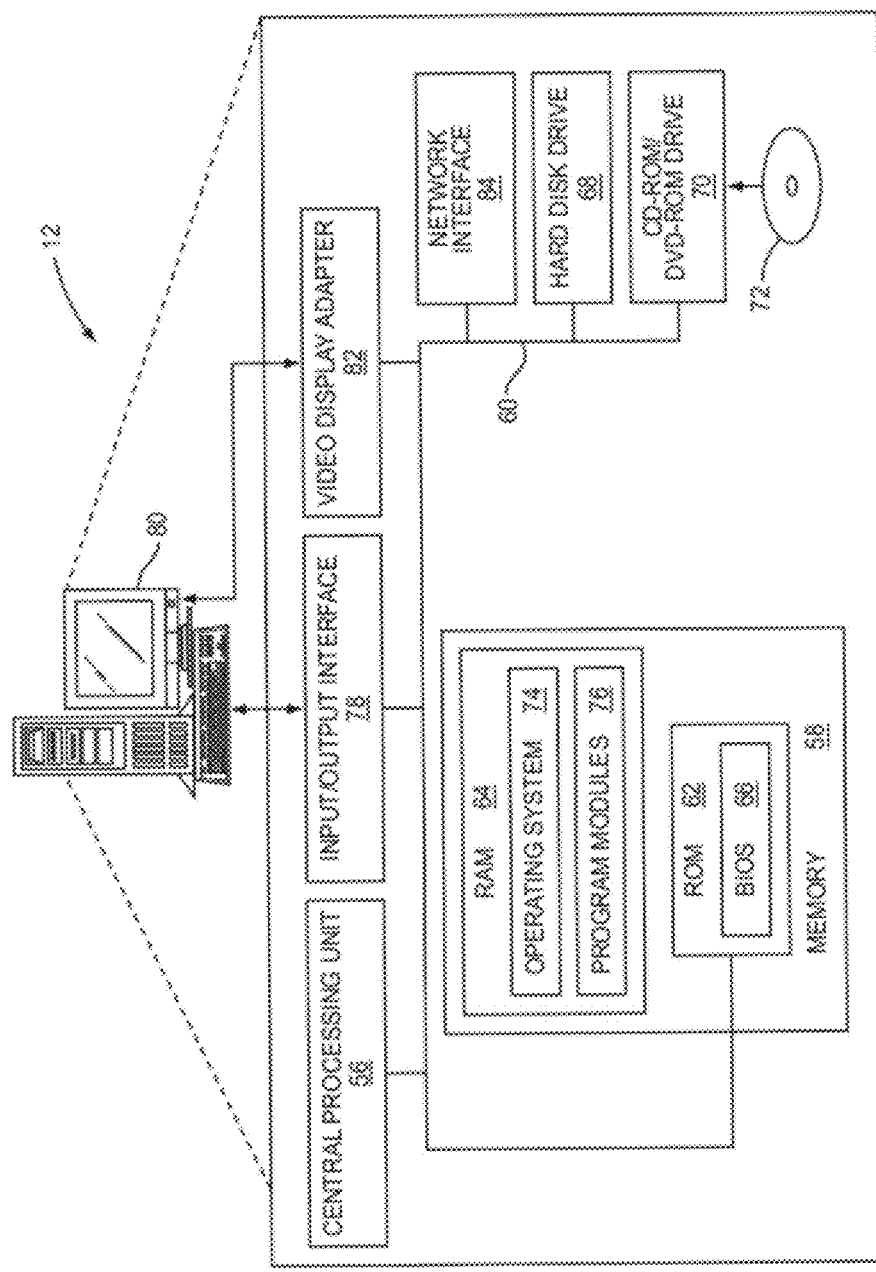
FIG. 11 is a block diagram of an exemplary computing device suitable for generating a raster file according to one embodiment of the present invention.

FIG. 11 is a block diagram of an exemplary computing device 12 suitable for generating a raster file according to one embodiment of the present invention. The computing device 12 includes a central processing unit 56, a system memory 58, and a system bus 60. The system bus 60 provides an interface for system components including, but not limited to, the system memory 58 and the central processing unit 56. The central processing unit 56 can be any of various commercially available or proprietary processors. Dual microprocessors and other multi-processor architectures may also be employed as the central processing unit 56.

The system bus 60 can be any of several types of bus structure that may further interconnect to a memory bus (with or without a memory controller), a peripheral bus, and a local bus using any of a variety of commercially available bus architectures. The system memory 58 can include non-volatile memory 62 and/or volatile memory 64 (e.g., random access memory (RAM)). A basic input/output system (BIOS) 66 can be stored in the non-volatile memory 62 (e.g., read-only memory (ROM), erasable programmable ROM (EPROM), electrically EPROM (EEPROM), etc.), which can include the basic routines that help to transfer information between elements within the computing device 12. The volatile memory 64 can also include a high-speed RAM such as static RAM for caching data.

The computing device 12 may include an internal hard disk drive (HDD) 68 (e.g., enhanced integrated development environment (EIDE), serial advanced technology attachment (SATA)) and an optical drive 70 (e.g., DVD, CD) for data storage. The drives and associated computer-readable media, such as DVDs or CD-ROMs 72, provide non-volatile storage of data, data structures, computer-executable instructions, and so forth. For the computing device 12, the drives and media accommodate the storage of any data in a suitable digital format. Although the description of computer-readable media above refers to a HDD 68 and removable optical media 72 such as a CD or DVD, it should be appreciated that other types of media which are readable by a computer, such as zip drives, magnetic cassettes, flash memory cards, cartridges, and the like, may also be used in the exemplary operating environment, and further that any such media may contain computer-executable instructions for performing methods described herein.

A number of program modules can be stored in the drives and volatile memory 64, including an operating system 74 and one or more program modules 76. It is to be appreciated that the computing device 12 can be implemented with various commercially available operating systems, such as LINUX, UNIX, Windows, and the like. The central processing unit 56, in conjunction with the volatile memory 64, can serve as a control system for the computing device 12. The control system can be adapted to perform the functionality described herein through one or more of the program modules 76.

A user can enter commands and information into the computing device 12 through one or more wired or wireless input devices, such as, for example, a keyboard and a pointing device, such as a mouse (not illustrated). Such input devices are often connected to the central processing unit 56 through an input device interface 78 that is coupled to the system bus 60, but can be connected by other interfaces such as a parallel port, IEEE 1394 serial port, a game port, a Universal Serial Bus (USB) port, an infrared (IR) interface, etc.

The computing device 12 may include a display 80, which may also be connected to the system bus 60 via an interface, such as a video display adapter 82. The computing device 12 may communicate with a network via a network interface 84, which may facilitate wired and/or wireless communications to the network.

All or portions of the functionality of the computing device 12 described herein may be implemented as a computer program product comprising a computer-usable medium having a computer-readable program code embodied therein. The computer-readable program code may be executed to implement the functionality described herein. For example, the computer-usable medium may comprise a disk drive, a hard drive, or other magnetic storage mediums; a CD, DVD, or other optical storage mediums; a flash drive or USB drive, or other solid state memory devices; or other suitable storage mediums usable by a computer. The computer-readable program code can include software instructions that implement the functionality described herein with respect to the computing device 12.

Those skilled in the art will recognize improvements and modifications to the preferred embodiments of the present invention. All such improvements and modifications are considered within the scope of the concepts disclosed herein and the claims that follow.

What is claimed is:

1. A method for producing a raster-based file defining synthetic aperture radar (SAR) scenery for use in generating a runtime database, comprising:
    for each of a plurality of texture elements (texels) representing respective surface regions of an elevated feature in the SAR scenery:
        determining a corresponding material identifier, wherein the material identifier identifies a material composition of the respective surface region;
        determining a corresponding surface height identifier, wherein the surface height identifier identifies a surface height of the respective surface region with respect to a reference point, and wherein the surface height identifier is determined based on a difference between digital surface model (DSM) elevation data corresponding to the respective surface region and a vertical datum reference point corresponding to the respective surface region; and
    communicating the corresponding material identifier and the corresponding surface height identifier for each of the plurality of texels to a destination.

2. The method of claim 1, wherein the reference point for the corresponding surface height identifier for each of the plurality of texels is the vertical datum reference point corresponding to the respective surface region represented by the respective texel.

3. The method of claim 1, further comprising, for the each of the plurality of texels representing respective surface regions of the elevated feature in the SAR scenery:
    determining a corresponding bare earth elevation (BEE) identifier, wherein the BEE identifier identifies a BEE of the respective surface region; and
    communicating the corresponding BEE identifier for each of the plurality of texels to the destination.

4. The method of claim 3, wherein the reference point for each corresponding channel height identifier comprises the BEE identifier of the corresponding texel.

5. The method of claim 4, wherein the DSM elevation data comprises Light Detection and Ranging (LIDAR) data comprising a plurality of LIDAR points, wherein each of the plurality of LIDAR points has a corresponding LIDAR elevation value, and further comprising modifying the LIDAR elevation values corresponding to the plurality of LIDAR points to convert the LIDAR elevation values from ellipsoid-referenced elevation values to geoid-referenced elevation values.

6. The method of claim 5, wherein modifying the LIDAR elevation values further comprises:
    identifying a plurality of control point locations in the SAR scenery corresponding to bare earth, and determining a plurality of elevation difference values identifying a difference between LIDAR elevation values corresponding to the plurality of control point locations and BEE elevation values corresponding to the plurality of control point locations;
    forming a triangulated irregular network (TIN) based on the plurality of elevation difference values;
    rasterizing the TIN to a desired resolution to form a rasterized elevation difference surface; and
    for each of the plurality of LIDAR points, modifying the corresponding LIDAR elevation value based on an elevation value of the rasterized elevation difference surface which corresponds to a location of the LIDAR point.

7. The method of claim 1, further comprising, for each of the plurality of texels representing respective surface regions of the elevated feature in the SAR scenery:
- determining a corresponding intensity identifier, wherein the intensity identifier identifies a grayscale intensity of the respective surface region;
- determining a corresponding orientation identifier, wherein the orientation identifier identifies an azimuth of the respective surface region; and
- communicating the corresponding intensity identifier and the corresponding orientation identifier for each of the plurality of texels to the destination.

8. The method of claim 1, wherein communicating the corresponding material identifier and the corresponding surface height identifier for each of the plurality of texels to a destination comprises storing the corresponding material identifier and the corresponding surface height identifier for each of the plurality of texels in a file.

9. The method of claim 8, further comprising:
- inputting, by a database compiler, the file, and generating, based on the file, the runtime database.

10. The method of claim 1, wherein determining the material identifier further comprises:
- determining a color composition of the respective surface region, the color composition comprising a red value, a green value, and a blue value;
- indexing a material composition cube with the red value, the green value, and the blue value, wherein the material composition cube identifies a plurality of different material compositions based on a color composition of the plurality of different materials; and
- obtaining from the material composition cube the material identifier based on the material composition at the index of the red value, the green value, and the blue value.

11. A computer-readable data structure encoded on a non-transitory computer-readable medium for representing synthetic aperture radar (SAR) scenery for use in generating a runtime database, the computer-readable data structure comprising:
- for each of a plurality of texture elements (texels) representing respective surface regions of an elevated feature in the SAR scenery:
  - a corresponding material identifier, wherein the material identifier identifies a material composition of the respective surface region; and
  - a corresponding surface height identifier, wherein the surface height identifier identifies a surface height of the respective surface region with respect to a reference point, and wherein the surface height identifier is determined based on a difference between digital surface model (DSM) elevation data corresponding to the respective surface region and a vertical datum reference point corresponding to the respective surface region.

12. The computer-readable data structure of claim 11, wherein the corresponding material identifiers and the corresponding surface height identifiers are readable by a database compiler for generating the runtime database.

13. The computer-readable data structure of claim 11, wherein the computer readable data structure further comprises:
- for the each of the plurality of texels representing respective surface regions of the elevated feature in the SAR scenery:
  - a corresponding bare earth elevation (BEE) identifier, wherein the BEE identifier identifies a BEE of the respective surface region.

14. The computer-readable data structure of claim 13, wherein the reference point for each corresponding channel height identifier comprises the BEE channel identifier of the corresponding texel.

15. The computer-readable data structure of claim 11, wherein the DSM elevation data comprises Light Detection and Ranging (LIDAR) data comprising a plurality of LIDAR points, wherein each of the LIDAR points has a corresponding LIDAR elevation value, and further comprising modifying the LIDAR elevation values corresponding to the plurality of LIDAR points to convert the LIDAR elevation values from ellipsoid-referenced elevation values to geoid-referenced elevation values.

16. A computing device for producing a raster-based file defining synthetic aperture radar (SAR) scenery for use in generating a runtime database, comprising:
- a data storage; and
- a control system coupled to the data storage and adapted to:
  - for each of a plurality of texture elements (texels) representing respective surface regions of an elevated feature in the SAR scenery:
    - determine a corresponding material identifier, wherein the material identifier identifies a material composition of the respective surface region;
    - determine a corresponding surface height identifier, wherein the surface height identifier identifies a surface height of the respective surface region with respect to a reference point, and wherein the surface height identifier is determined based on a difference between digital surface model (DSM) elevation data corresponding to the respective surface region and a vertical datum reference point corresponding to the respective surface region; and
  - store the corresponding material identifier and the corresponding surface height identifier for each of the plurality of texels in a data structure in the data storage.

17. The computing device of claim 16, wherein the reference point for the corresponding surface height identifier for each of the plurality of texels is the vertical datum reference point corresponding to the respective surface region represented by the respective texel.

18. The computing device of claim 16, wherein the control system is further adapted to, for each of the plurality of texels representing respective surface regions of the elevated feature in the SAR scenery:
- determine a corresponding bare earth elevation (BEE) identifier, wherein the BEE identifier identifies a BEE of the respective surface region; and
- store the corresponding BEE identifier for each of the plurality of texels in the data structure.

19. The computing device of claim 18, wherein the reference point for each corresponding channel height identifier comprises the BEE channel identifier of the corresponding texel.

20. The computing device of claim 19, wherein the DSM elevation data comprises Light Detection and Ranging (LIDAR) data comprising a plurality of LIDAR points, wherein each of the LIDAR points has a corresponding LIDAR elevation value, and wherein the control system is further adapted to modify the LIDAR elevation values corresponding to the plurality of LIDAR points to convert the LIDAR elevation values from ellipsoid-referenced elevation values to geoid-referenced elevation values.

21. The computing device of claim 20, wherein to modify the LIDAR elevation values, the control system is further adapted to:

identify a plurality of control point locations in the SAR scenery corresponding to bare earth, and determine a plurality of elevation difference values identifying a difference between LIDAR elevation values corresponding to the plurality of control point locations and BEE elevation values corresponding to the plurality of control point locations;

form a triangulated irregular network (TIN) based on the plurality of elevation difference values;

rasterize the TIN to a desired resolution to form a rasterized elevation difference surface; and for each of the plurality of LIDAR points, modify the corresponding LIDAR elevation value based on an elevation value of the rasterized elevation difference surface which corresponds to a location of the LIDAR point.

* * * * *

UNITED STATES PATENT AND TRADEMARK OFFICE
CERTIFICATE OF CORRECTION

PATENT NO. : 8,242,948 B1  
APPLICATION NO. : 12/713544  
DATED : August 14, 2012  
INVENTOR(S) : John Burky and Sharon Shahan Page 1 of 1

It is certified that error appears in the above-identified patent and that said Letters Patent is hereby corrected as shown below:

Column 1,
Line 3, please insert:

--STATEMENT REGARDING FEDERALLY SPONSORED RESEARCH OR DEVELOPMENT

This invention was made with Governmental support under Contract No. N00019-02-C-3002, awarded by Naval Air Systems Command, Joint Strike Fighter Program Office. The Government has certain rights in this invention.--

Signed and Sealed this
Twenty-second Day of January, 2013

David J. Kappos
*Director of the United States Patent and Trademark Office*